United States Patent [19]

Föhl

[11] 4,008,863
[45] Feb. 22, 1977

[54] WINDING-UP ROLLER FOR SAFETY BELTS

[76] Inventor: Artur Föhl, Schelmenwasenstr. 68, 7061 Haubersbronn, Germany

[22] Filed: Oct. 8, 1974

[21] Appl. No.: 513,119

Related U.S. Application Data

[63] Continuation of Ser. No. 317,356, Dec. 21, 1972, abandoned.

[30] Foreign Application Priority Data

Dec. 22, 1971 Germany .......................... 2163788

[52] U.S. Cl. ........................... 242/107.4 B; 242/74
[51] Int. Cl.² .................. A62B 35/00; B65H 75/48
[58] Field of Search ...................... 242/107–107.7, 242/74, 74.1

[56] References Cited

UNITED STATES PATENTS

| | | | |
|---|---|---|---|
| 3,100,609 | 8/1963 | Wrighton | 242/107.4 |
| 3,202,379 | 8/1965 | Wrighton | 242/107.4 |
| 3,323,743 | 6/1967 | Landgraf | 242/74 |
| 3,445,078 | 5/1969 | Smith | 242/107.4 |
| 3,695,545 | 10/1972 | Peters | 242/107.4 |
| 3,698,657 | 10/1972 | Kirchhoff | 242/107.4 |

Primary Examiner—Stanley N. Gilreath
Assistant Examiner—John M. Jillions
Attorney, Agent, or Firm—Walter Becker

[57] ABSTRACT

A roller system for a safety belt with a winding-up shaft coupled to a return spring and connected to a belt end while being journalled in a housing, the roller system also comprising a locking mechanism. The winding-up shaft or a compensating sleeve arranged thereon has its outer contour within the region of its connection with the belt so designed that the belt when being wound off or on describes the path of an Archimedes spiral.

6 Claims, 6 Drawing Figures

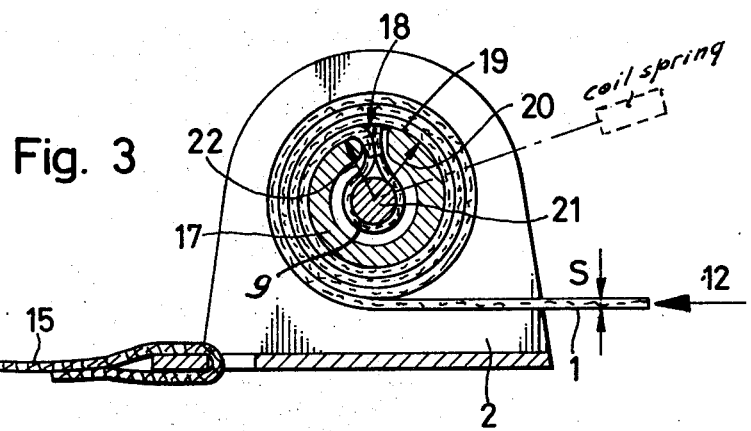
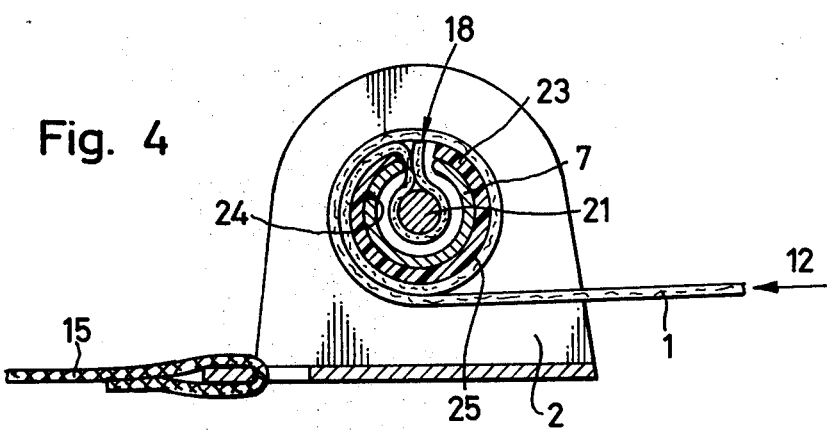
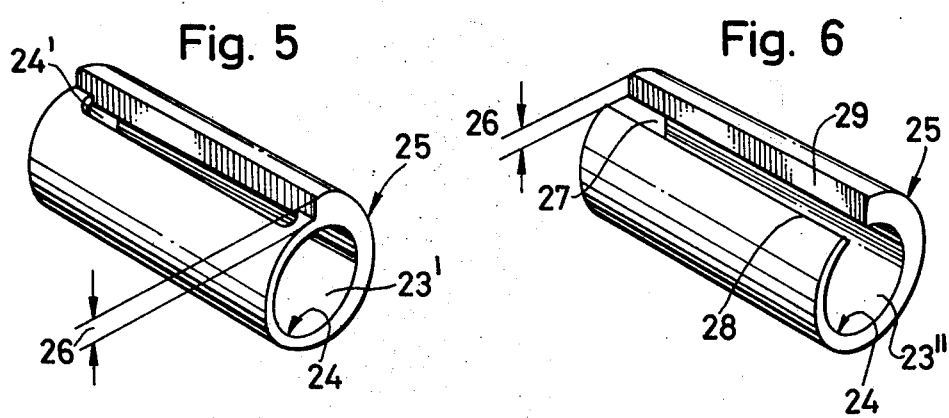

WINDING-UP ROLLER FOR SAFETY BELTS

This is a continuation of application Ser. No. 317,356, filed Dec. 21, 1972, now abandoned.

The present invention concerns a winding-up roller, preferably for safety belts for protecting passengers in automobiles and airplanes.

All such devices have the same basic construction, namely a winding-up shaft coupled to a return spring and connected to one of the belt ends, the shaft being journalled in a frame or housing. Furthermore, such device comprises a locking mechanism for locking the rotary movement of the winding-up shaft.

Fundamentally two different systems for such devices are known, namely:

a. Automatically locking devices, and
b. devices which lock in an emergency.

The devices set forth above under a) will when applying the safety belt permit any desired winding-off of the belt, normally up to the engagement of the pertaining closure member. The locking mechanism is in this instance so designed that at a slight backward movement of the user of the belt the winding-up shaft will lock in this position and will not permit the user a renewed forward movement. If the user wants to move forwardly again, he first has to open the belt closure and has to let the belt return to its starting position before it can be pulled out again. A detailed description of the locking mechanism required in this connection does not appear to be necessary inasmuch as the present invention is preferably directed to an important improvement of the system set forth above under b).

The winding-up roller for safety belts mentioned under b) represents a mechanism which allows the user of the belt any desired movement, in other words the belt may at will be wound up and wound off, and only in case of danger, i.e., in case of an emergency, will a further winding-off of the safety belt be prevented by a corresponding locking mechanism. Frequently the locking is initiated by correspondingly arranged inertia means in conformity with the pulling-off acceleration. The pulling-off acceleration is kept within very narrow limits in conformity with the laws of the respective countries and, therefore, a very precise initiation of the locking operation is required.

Experience has proved that with a highly sensitive design of the locking mechanism with uniform pulling off and return winding speed a slight premature triggering of the locking elements will be initiated. Thorough investigations have proved that such faulty control is caused by a faulty concentric running of the roll of belt material and the inherent differences in the rotary acceleration on the winding-up shaft. A faulty concentric running of the belt roll is encountered primarily with winding-up rollers of small dimensions because the belt end protrudes beyond the core of the reel by several times the thickness of the belt so that at this area a faulty concentricity is caused.

It is, therefore, an object of the present invention to provide means which will safely overcome the above referred to drawbacks.

This object and other objects and advantages of the invention will appear more clearly from the following specification in connection with the accompanying drawings, in which:

FIG. 3 illustrates a cross section through a reel core according to the invention.

FIG. 4 is a cross section through a compensating sleeve for use in connection with the invention.

FIG. 5 is an isometric view of a compensating sleeve for use in connection with the invention.

FIG. 6 is an isometric view of a modified compensating sleeve.

The winding-up roller according to the present invention is characterized primarily in that the reel core is directly or indirectly changed as to its cross-sectional shape in such a way that the wound-up safety belt will form a uniform roll in conformity with the path of an Archimedes spiral with the pitch equalling the thickness of the belt.

In conformity with a practical realization of this feature, the normally tubular winding-up shaft may merely within the region of the belt connection be deformed as to its cross section in such a way that the outer shape corresponds to an Archimedes spiral which ascends in winding-up direction.

According to a further suggestion of the invention, it is also possible, without changing the winding-up shaft itself, merely by slipping or snapping onto the shaft a correspondingly shaped compensating sleeve to realize indirectly in a simple manner a uniform winding-up and winding-off of the safety belt. This design is of great importance because such compensating sleeve can be produced at low costs, preferably when making it of synthetic material by an extrusion or injection method.

Figure 1:
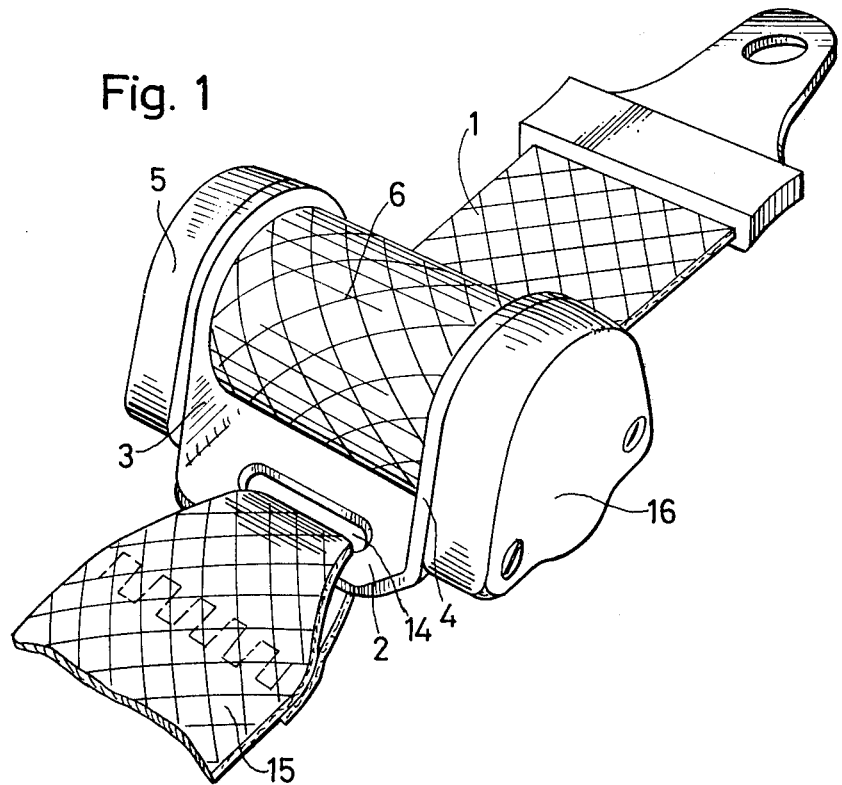
FIG. 1 is an isometric illustration of a winding-up roller according to the invention for safety belts.
Figure 2:
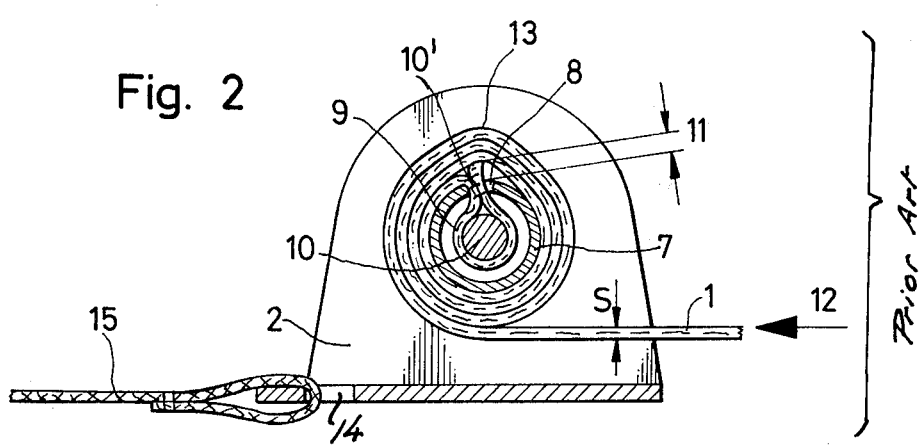
FIG. 2 is a cross section through a belt roll of a heretofore known design.

Referring now to the drawings in detail, the belt winding-up roller according to FIGS. 1 to 6 is intended for a safety belt 1 and has a U-shaped bent housing 2. The not pulled out portion of belt 1 is by means of a return spring 5 (not shown in detail) rolled up to form a roll 6 located between the side walls 3 and 4 of housing 2.

As reel core there is employed a tubular winding-up shaft 7 which within the region of the belt connection has a slot 8 for introducing and connecting the belt 1 to an end loop 9 by means of a bolt 10 of shaft 7. The end loop 9 of belt 1 is by means of a short seam connected at 10' and protrudes beyond the reel core to the extent indicated by the reference numeral 11. This protrusion will, when winding up the belt in the direction indicated by the arrow 12, produce a considerable non-concentricity 13.

Provided at the bottom of the housing 2 there is a slot 14 for connecting the second belt section 15.

Opposite to the return spring 5 on the side wall 4 there is arranged the locking mechanism 16 which cooperates with the shaft 7. The locking mechanism 16, which is not illustrated, may be of any standard design known per se.

According to FIG. 3, with the same shape of the end loop 9, the winding-up shaft 17 is so designed that the looped belt end 18 coincides at least with the outer mantle line 19 of the shaft 17 according to the invention. Assuming that at 19 the radius of shaft 17 counted from the shaft axis 21 is the radius 20, it will be evident that this radius decreases to the radius 22 by the thickness $s$ of the belt. As a result thereof, when winding-up and winding-off the belt, a uniform roll will be produced which cannot cause any faulty controls. However, such a deformation of the shaft 17 increases the overall size of the structure and therefore is not generally applicable.

According to a further suggestion of the present invention, the design of FIG. 4 is provided with a compensating sleeve 23 applied to shaft 7. Sleeve 23 is concentric on its inside 24 and has a spiral shape on its outer side 25. The outer contour corresponds to an Archimedes spiral with the pitch 26 equalling the thickness s of the belt. This compensating sleeve 23 is preferably made of a low cost synthetic material.

FIG. 5 shows a closed compensating sleeve 23' which is provided with a belt slot 24' and is adapted to be slipped over the shaft 21. The extension 26 corresponds to the pitch of the spiral and equals the belt thickness s.

FIG. 6 shows a snap-on compensating sleeve 23'' which is preferably made of extrudable spring-elastic synthetic material. In view of the open slot 27, there exists the possibility of mounting the sleeve 23'' on shaft 7 by snapping the sleeve onto the shaft after the two longitudinal edges 28 and 29 have been temporarily bent apart.

It is, of course, to be understood that the present invention is, by no means, limited to the particular showing in the drawings but also comprises any modifications within the scope of the appended claims.

What I claim is:

1. In the combination with a safety belt, of an impact emergency blocking belt winding-up roller system having a return spring and winding-up shaft means coupled to said return spring and connected to one of said belt, said roller system also having a locking mechanism for blocking further pull-out of said belt, the improvement which comprises forming said winding-up shaft means with an outer contour in the path of an Archimedes spiral having a pitch corresponding substantially to the thickness of said belt, said belt being wound on said shaft means starting at the point of smallest radius and proceeding about said spiral surface to the point of greatest radius, the contacting surface of said belt with the shaft means and with itself lying in the path of said Archimedes spiral, so that when said belt is drawn out or retracted at a uniform rate, the speed of rotation of said shaft means will vary at a uniform rate.

2. An arrangement in combination according to claim 1, in which said shaft means comprises a shaft and a compensating sleeve mounted thereon having wall means increasing from a thinnest to a thickest portion to provide an outer contour in the path of an Archimedes spiral, and within the region of its thinnest wall means being provided with a slot extending in the longitudinal direction of said sleeve for passing an end portion of said belt therethrough.

3. An arrangement in combination according to claim 2, in which said compensating sleeve forms an expandable sleeve having an opening slightly less in diameter than said shaft to effect a snap-on fit when pressed on said shaft.

4. An arrangement in combination according to claim 3, in which said snap-on sleeve is of a spring elastic synthetic material.

5. An arrangement in combination according to claim 2, in which said compensating sleeve has a desired minimum wall thickness, the extension of said compensating sleeve adjacent said slot corresponds to the Archimedes spiral in pitch.

6. An arrangement in combination according to claim 2, in which said compensating sleeve when viewed in cross section has an increase in wall thickness from its thinnest to its thickest section which amounts to approximately the belt thickness.

* * * * *